No. 846,166. PATENTED MAR. 5, 1907.
W. H. THOMAS.
BILLIARD CUE.
APPLICATION FILED OCT. 16, 1906.
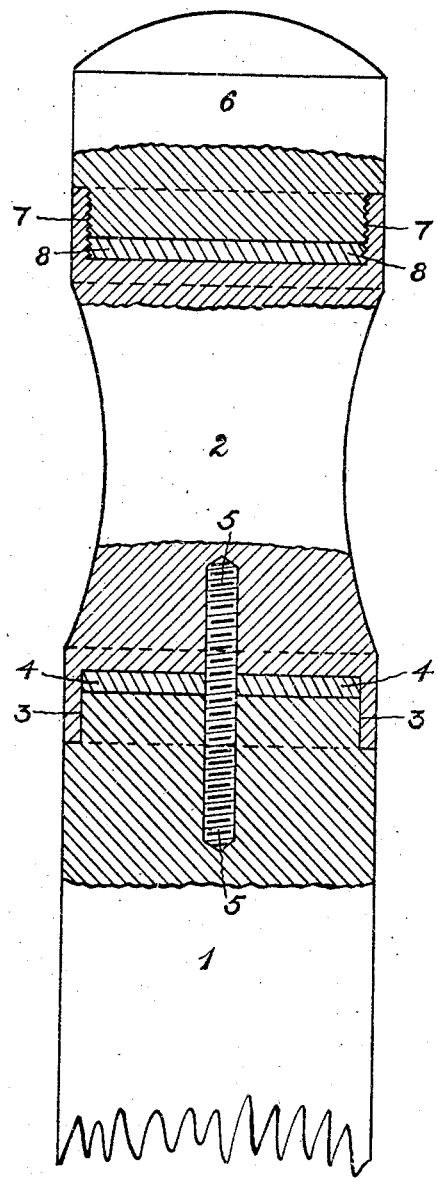
Witnesses:
Inventor:
William Henry Thomas
by Chas. Wendale
Attorney

UNITED STATES PATENT OFFICE.

WILLIAM HENRY THOMAS, OF ERMELO, TRANSVAAL.

BILLIARD-CUE.

No. 846,166.	Specification of Letters Patent.	Patented March 5, 1907.

Application filed October 16, 1906. Serial No. 339,233.

*To all whom it may concern:*

Be it known that I, WILLIAM HENRY THOMAS, a subject of the King of Great Britain, and a resident of Ermelo, Transvaal, have invented certain new and useful Improvements Relating to Billiard - Cues, of which the following is a specification.

This invention relates to billiard-cues and to means for fixing the tips on the ends thereof.

The objects of the present invention are to provide means whereby the tips may by fixed on the ends of the cues with increased facility and greater permanency; also to obviate the splitting of the ends of the cues on which the tips are fixed.

The invention is illustrated in the accompanying drawing, which shows to an enlarged scale a portion of a billiard-cue and my improved means of fixing the tip thereon. The view is a part sectional elevation.

In the drawing, 1 represents that end of the billiard-cue on which the tip is usually directly fixed. The end of the cue 1 is slightly reduced in diameter and has fitted over it and fixed to it what I may term the "tip-holder" 2. The holder 2 is recessed or made cup-shape to receive the end of the cue 1, as indicated at 3, and the external diameter of the end of the holder 2 is the same as the external diameter of the end of the cue 1, so that a smooth joint is made between them. In the recess 3 in the holder 2 and between it and the end of the cue 1 is placed a diaphragm or washer 4, of rubber or other resilient material.

The holder 2, which may be made of metal, vulcanite, celluloid, or any other suitable material, is fixed on the end of the cue 1 by means of a screw 5, which, as shown, screws for a suitable distance into the holder 2 and also into the end of the cue 1. When the holder 2 is screwed down into position on the end of the cue 1, the rubber diaphragm or washer 4 is preferably placed in compression, so that it serves to absorb the concussion resulting from the impacts of the cue with the balls or from any other cause.

By making the holder 2 cup shape and inserting the rubber diaphragm 4 the liability of the cue to split is minimized if not entirely eliminated.

The holder 2 may be of the configuration shown or of any other desired shape.

The other end of the holder 2, in which the tip 6 (which as at present may be made of leather or any other suitable material) is secured, is recessed or made cup shape, as indicated at 7, and provided with an internal thread. In the bottom of the recess 7, between the holder 2 and the tip 6, is placed a diaphragm or washer 8, of rubber or other suitable resilient material. The end of the tip 6 is reduced in diameter and is screwed into the internally-threaded hole 7 in the holder 2. The external diameter of the end of the holder 2 is the same as the external diameter of the tip 6, so that a smooth joint is made between them. When the tip 6 is screwed home, the rubber or other resilient diaphragm 8 is placed slightly in compression, so that it also serves to absorb the concussion resulting from the tip striking the billiard-balls or otherwise.

What I claim as my invention, and desire to protect by Letters Patent, is—

In a billiard-cue and means for fixing a tip thereon, in combination, a cue reduced in diameter at the end, a holder made cup shape at one end to fit the reduced portion of the cue, a screw screwed into the end of the cue and into the end of the holder for connecting the latter to the former, a resilient diaphragm fitted into the end of the holder next the end of the cue, the other end of the holder being made cup shape and formed with an internal thread, a tip reduced in diameter screwing into the end of the holder, and a resilient diaphragm fitted in the recess in the holder next the end of the tip, substantially as described.

In witness whereof I have hereunto set my hand in the presence of two subscribing witnesses.

WILLIAM HENRY THOMAS.

Witnesses:
CHAS. OVENDALE,
R. OVENDALE.